United States Patent [19]
Ito et al.

[11] Patent Number: 5,815,760
[45] Date of Patent: Sep. 29, 1998

[54] MODE SELECTING SWITCH FOR CAMERA

[75] Inventors: Toru Ito; Jun Hiraku; Nobuhiro Aoki, all of Saitama, Japan

[73] Assignee: Fuji Photo Optical Co., Ltd., Saitama, Japan

[21] Appl. No.: 892,990

[22] Filed: Jul. 15, 1997

[30] Foreign Application Priority Data

Sep. 17, 1996 [JP] Japan .................................. 8-244998
Sep. 17, 1996 [JP] Japan .................................. 8-244999

[51] Int. Cl.⁶ .................................................. G03B 17/38
[52] U.S. Cl. ............................................................ 396/543
[58] Field of Search ............................................ 396/543

[56] References Cited

FOREIGN PATENT DOCUMENTS 61-53740  4/1986  Japan .

*Primary Examiner*—Howard B. Blankenship
*Attorney, Agent, or Firm*—Leydig, Voit & Mayer, Ltd.

[57] ABSTRACT

A switch for a camera includes a switch button. While being urged toward a flange section of a switch-button holding member by an urging member, the switch button is held so as to be movable in the pushing direction of the switch button and a direction perpendicular to the pushing direction. When one end of the switch button is pushed, the height to which the other end is raised can be lowered. Accordingly, the appearance of the camera is prevented from deteriorating. The switch is also advantageous in reducing the size of the camera.

12 Claims, 12 Drawing Sheets

MODE SELECTING SWITCH FOR CAMERA

BACKGROUND OF THE INVENTION

1. Field of the Invention

The present invention relates to a switch for a camera and, in particular, to a switch for a camera having a plurality of contacts, such as a mode-selecting switch for a camera.

2. Related Background Art

A mode-selecting switch for a camera is typically attached to the back cover of the camera. A conventionally-known example of its configuration is shown in FIG. 16. This drawing is a schematic cross-sectional view showing a conventional mode-selecting switch for a camera. A mode-selecting switch 50 depicted therein has a switch button 56 which is pivotable about a rotation axis 54 disposed in an inner frame 61. The lower face of the switch button 56 is provided with a click-plate pushing section 56a. Below the switch button 56, a click plate 60 is disposed on an electrode (not depicted) mounted on a flexible printed circuit board 58, thereby forming a contact.

As shown in FIG. 17, when one end 56b of the switch button 56 is pushed, the mode-selecting switch 50 pivots about the rotation axis 54. Consequently, the click plate 60 is pushed by the click-plate pushing section 56a so as to be pressed against the electrode mounted on the flexible printed circuit board 58, bringing the contact into a conduction state.

In this conventional mode-selecting switch 50, the switch button 56 pivots about the rotation axis 54 when one end of the switch button 56 is pushed. Accordingly, the other end 56c of the switch button 56 may rise up so high that a side face 56d of the switch button 56 is largely exposed to the outside from the surface of a back cover 52 of the camera, thereby deteriorating its appearance.

SUMMARY OF THE INVENTION

In order to overcome the problem of the prior art mentioned above, it is an object of the present invention to provide a switch for a camera, which does not deteriorate the appearance of the camera at the time of operation and can contribute to size reduction of the camera.

According to one aspect of the present invention, there is provided a switch for a camera comprising:

a switch button having a plurality of contact-pushing sections and a through-hole disposed between the contact-pushing sections;

a plurality of contacts disposed at positions opposing the contact-pushing sections of the switch button;

a switch-button holding member for holding the switch button, the switch-button holding member having one end provided with a flange section and the other end provided with an axis section, the axis section penetrating through the through-hole of the switch button; and urging means for urging the switch button toward the flange section of the switch-button holding member, wherein the switch button is held so as to be movable in a direction along which the switch button is pushed and a direction perpendicular to the pushing direction.

In accordance with this aspect of the present invention, when one end of the switch button is pushed, the switch button pivots about the position where the upper face of the switch button on the opposite side across the switch-button holding section and the lower face of the flange section of the switch-button holding member are in contact with each other. Consequently, the contact-plate pushing section at the pushed position pushes a click plate so as to make it pressed against an electrode, thereby bringing the contact into a conduction state. Here, the unpressed end of the switch button is raised higher than the outer surface of the camera. Since the distance between the thus raised position of the switch button and the position of the pivot center becomes shorter than the distance between the pushed position of the switch button and the position of the pivot center, the height to which the switch button is raised can be lowered.

Also, even in a switch in which a plurality of contacts are disposed along its circumferential direction, the height to which the unpressed side of the switch button is raised can be lowered, thereby preventing the appearance of the camera from deteriorating upon switch operations.

In the case where a stopper section for preventing a plurality of contacts from being concurrently pushed is provided, when one end of the switch button is pushed, the stopper section on the pushed side comes into contact with the printed circuit board. Accordingly, the contact-pushing section on the opposite side across the switch-button holding section does not push the click plate, whereby the contact on the opposite side across the switch-button holding section can be prevented from being concurrently pushed.

According to another aspect of the present invention, there is provided a switch for a camera comprising:

a switch button having a plurality of contact-pushing sections;

a plurality of contacts disposed at positions opposing the contact-pushing sections of the switch button;

an exterior part of the camera; and urging means for urging the switch button toward the exterior part, wherein the switch button is held in a state in which an edge portion thereof abuts to the exterior part.

Here, "contact" also encompasses a contact which establishes a conduction state when an electrode pattern is pushed by a contact-pushing section made of a conductive rubber or the like.

In accordance with this aspect of the present invention, when one end of the switch button is pushed, the switch button pivots while descending as a whole against the force exerted by the urging means and slightly moving rightward and leftward. Consequently, the contact-pushing section at the pressed position pushes the contact member so as to establish a conduction state at the contact. Here, since the switch button pivots while descending, the end of the switch button on the unpressed side is prevented from rising higher than the outer surface of the camera, whereby the appearance of the camera is not deteriorated.

In the case where the stopper section is provided, when the switch button is pushed near its center portion, the stopper section blocks the contact-pushing sections of the switch button and their corresponding contacts from coming closer to each other than a predetermined distance, whereby the contact-pushing sections on both sides across the stopper section can be prevented from concurrently pushing the contacts.

In the case where the switch button has a recessed section while an inner frame having a protruded section is provided, after the recessed section of the switch button comes into contact with the protruded section of the inner frame, the switch button pivots along the spherical form of the protruded section, allowing a smooth pivoting operation.

In the case where the switch button has a protruded section while an inner frame having a recessed section is provided, after the protruded section of the switch button comes into contact with the recessed section of the inner frame, the switch button pivots along the spherical form of the recessed section, allowing a smooth pivoting operation.

The present invention will be more fully understood from the detailed description given hereinbelow and the accompanying drawings, which are given by way of illustration only and are not to be considered as limiting the present invention.

The scope of applicability of the present invention will also become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
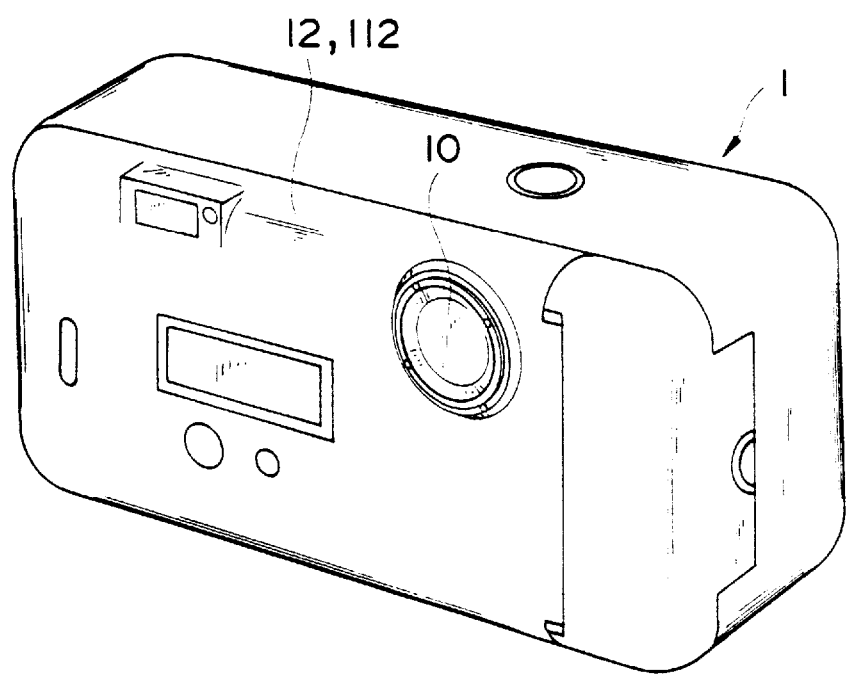
FIG. 1 is a perspective view showing a camera equipped with a mode-selecting switch for a camera in accordance with Embodiment 1 of the present invention, observed from its back cover side.

The present invention will be explained in further detail with reference to accompanying drawings. In the drawings, the same marks refer to parts identical or corresponding to each other.

Embodiment 1

Figure 2:
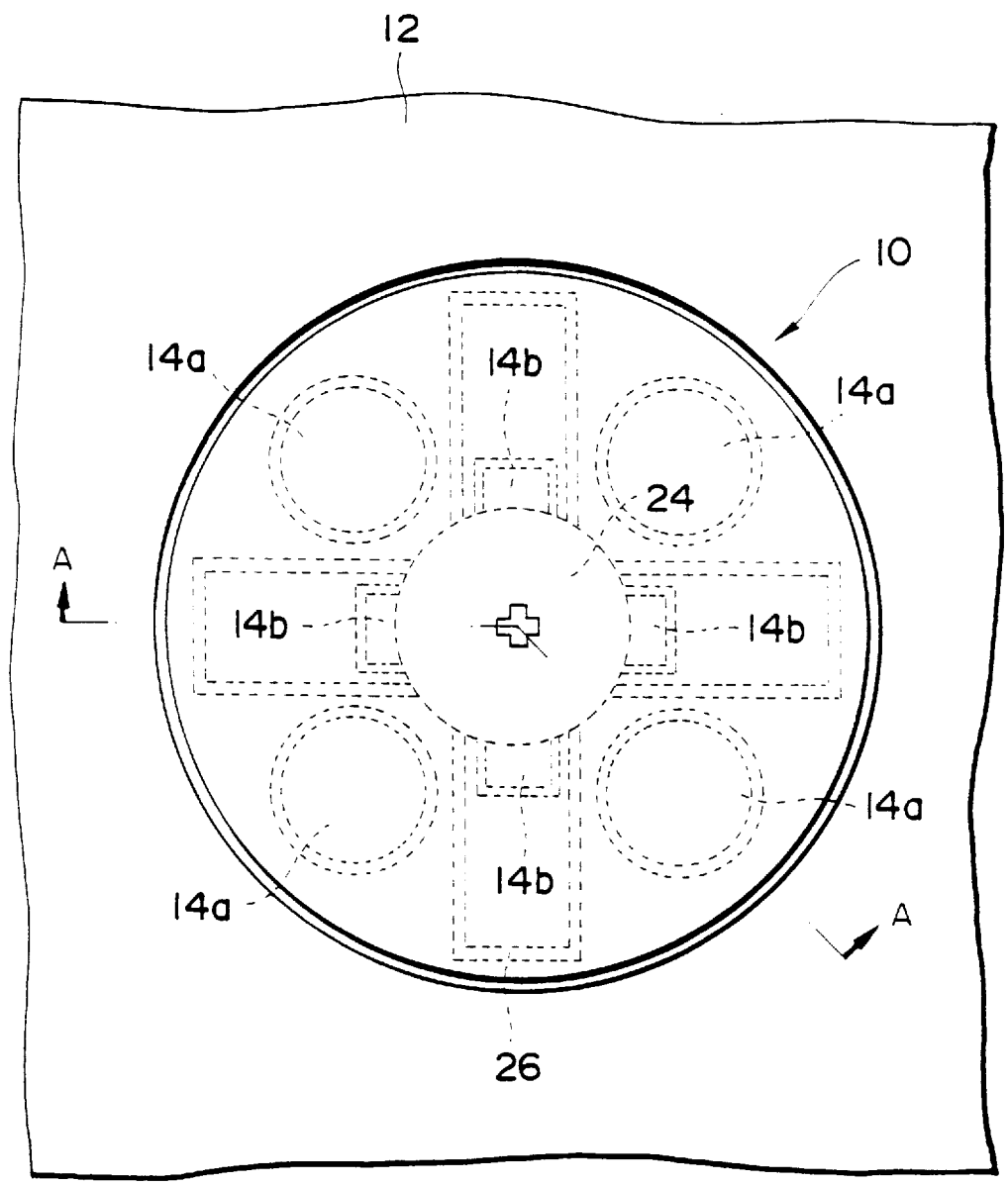
FIG. 2 is a plan view showing the mode-selecting switch for a camera in accordance with Embodiment 1.
Figure 3:
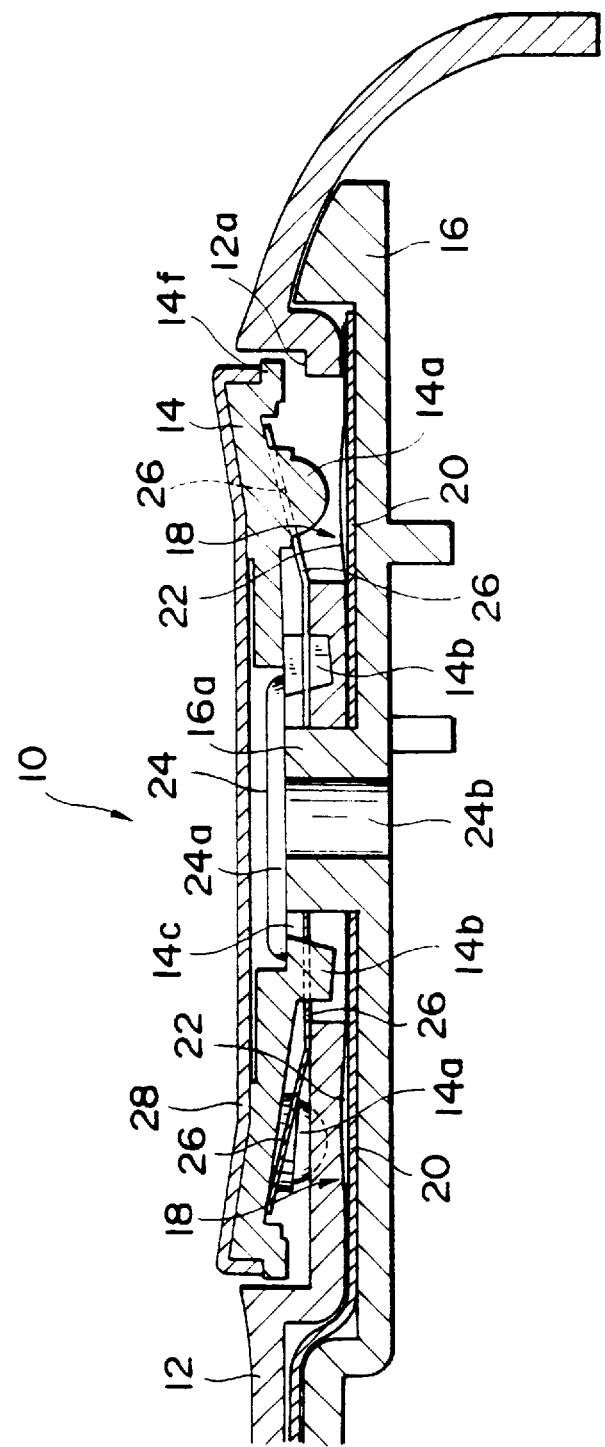
FIG. 3 is a cross-sectional view showing the mode-selecting switch for a camera in accordance with Embodiment 1 taken along line A—A in FIG. 2.
Figure 4:
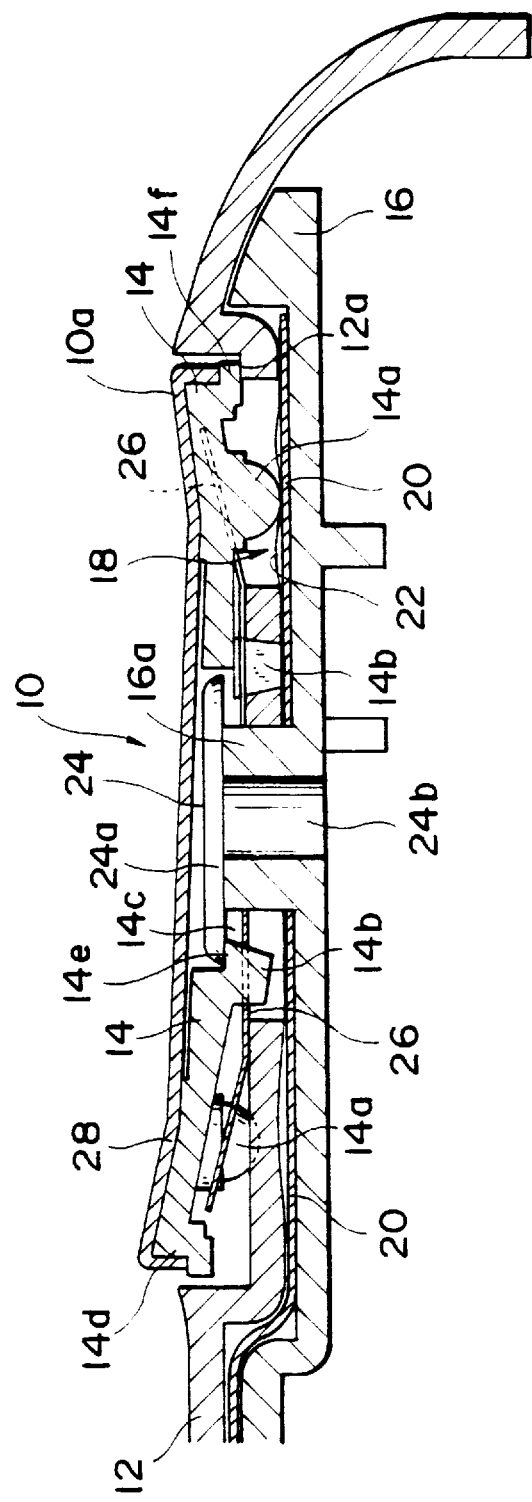
FIG. 4 is a cross-sectional view showing an operating state of the mode-selecting switch for a camera in accordance with Embodiment 1 taken along line A—A in FIG. 2.

With reference to FIGS. 1 to 4, the configuration of a mode-selecting switch for a camera in accordance with Embodiment 1 of the present invention will be explained. FIGS. 1 to 3 are a perspective view of the camera observed from its back cover side, a plan view of the mode-selecting switch for the camera, and a cross-sectional view of the mode-selecting switch (taken along line A—A in FIG. 2), respectively.

As shown in these drawings, this mode-selecting switch 10 has four contacts and is attached to a back cover 12 of a camera 1. A disk-shaped switch button 14 has a lower face provided with four click-plate pushing sections 14a disposed in the circumferential direction with the same intervals therebetween. Also, disposed between each pair of the neighboring click-plate pushing sections 14a, 14a on the lower face of the switch button 14 is a stopper section 14b projecting toward an inner frame 16.

The center portion of the disk-shaped switch button 14 is bored with a through-hole 14c penetrating therethrough. Also, contacts 18 are disposed at respective positions of the inner frame 16 opposing the click-plate pushing sections 14a. Each contact 18 comprises an electrode (not depicted) disposed on a flexible printed circuit board 20 and a click plate 22. When the click plate 22 is pressed against the electrode, the contact 18 is brought into a conduction state. Also, the inner frame 16 is provided with a boss 16a which is raised for holding the switch button 14.

A switch-button holding member 24 has one end provided with a flange section 24a and the other end provided with an axis section 24b having a thread. Also, a leaf spring 26 is used for urging the switch button 14 toward the flange section 24a of the switch-button holding member 24.

In order to assemble the mode-selecting switch 10, the boss 16a disposed in the inner frame 16 is inserted into the through-hole 14c at the center portion of the switch button 14, and the axis section 24b of the switch-button holding member 24 and the boss 16a are screwed together. Further, a switch-button cover 28 is placed over the switch button 14 and then firmly attached to the latter by means of a double-sided adhesive tape or the like, thereby accomplishing the assembly. Consequently, the surface of the flange section 24a of the holding member 24 is prevented from being exposed to the outside of the camera, whereby the appearance of the camera does not deteriorate.

Here, since the switch button 14 is urged toward the flange section 24a of the switch-button holding member 24 by the leaf spring 26, the switch button 14 is maintained in a state where the upper face of the edge portion of the through-hole 14c is pressed against the lower face of the flange section 24a.

When one end 10a of the mode-selecting switch 10 for a camera in accordance with this embodiment is pushed by a finger or the like, the switch button 14 pivots about a position 14e at which the upper face of the switch button 14 on the opposite side across the switch-button holding member 24 and the lower face of the flange section 24a of the switch-button holding member 24 are in contact with each other. Consequently, the click-plate pushing section 14a at the pushed position pushes the click plate 22, thereby bringing the contact 18 into a conduction state. Here, though an end 14d opposite to the pushed side of the switch button 14 is raised higher than the surface of the back cover 12 of the camera, the height to which the switch button 14 is raised can be lowered, thereby preventing the appearance of the camera from deteriorating upon operations.

Also, when the switch button 14 is pushed, a flange section 14f formed at the periphery of the switch button 14 abuts to a receiving section 12a of the back cover 12 for receiving the switch button 14. Accordingly, even when the switch button 14 is pushed hard, no strong force is exerted on the inner frame 16.

Further, when the click-plate pushing section 14a pushes the click plate 22, its adjacent stopper sections 14b concurrently come into contact with the flexible printed circuit board 20. Accordingly, the click-plate pushing section 14a on the opposite side across the switch-button holding member 24 does not push the click plate 22, whereby the contact 18 on the opposite side across the switch-button holding member 24 can be prevented from being concurrently pushed.

When the finger or the like pushing the switch button 14 is released, the leaf spring 26 pushes up the switch button 14 to its initial position.

Embodiment 2

In the following, the configuration of a mode-selecting switch for a camera in accordance with Embodiment 2 will be explained with reference to FIG. 5.

Figure 5:
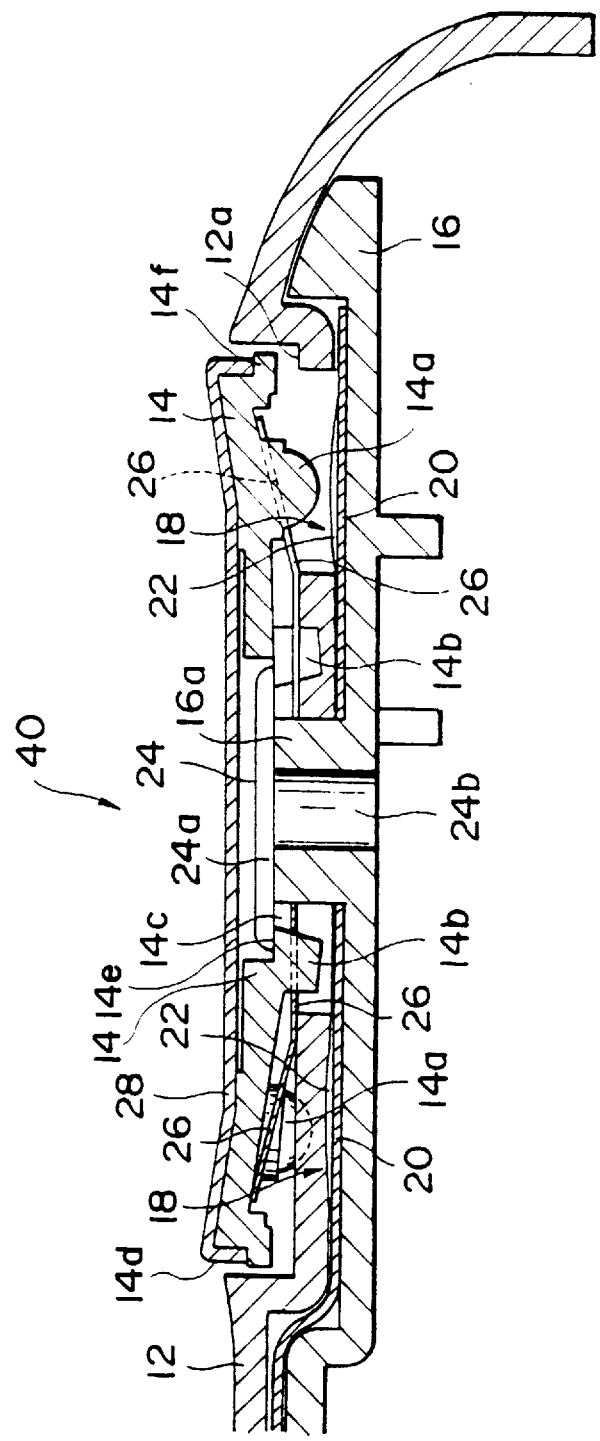
FIG. 5 is a schematic cross-sectional view showing a mode-selecting switch for a camera in accordance with Embodiment 2.

FIG. 5 is a cross-sectional view showing the mode-selecting switch for a camera in accordance with this embodiment. This mode-selecting switch 40 has two contacts and is attached to the back cover 12 of the camera 1. On the lower face of the switch button 14, two click-plate pushing sections 14a are disposed on opposite sides across the switch-button holding member 24, whereas the stopper sections 14b are disposed inside the respective click-plate pushing sections 14a. Also, the contacts 18 are attached to the inner frame 16 at the positions opposing the respective click-plate pushing sections 14a, i.e., positions respectively opposing the two click-plate pushing sections 14a. Except for these points, the mode-selecting switch 40 is the same as the mode-selecting switch 10 in accordance with Embodiment 1.

As with the mode-selecting switch 10 in accordance with Embodiment 1, the height to which the end 14d of the switch button 14 on the unpushed side is raised upon switch operations can be lowered in the mode-selecting switch 40 in accordance with Embodiment 2.

Though the foregoing Embodiments 1 and 2 respectively exemplify the cases where the number of contacts is four and two, without being restricted thereto, the present invention is also applicable to the case where the number of contacts is three or more than four.

Though the leaf spring 26 is used for urging the switch button 14 in the direction opposite to the pushing direction of the switch button 14 in the foregoing embodiments, the repulsion force of the click plate 22 may be increased so as to urge the switch button 14 in the direction opposite to the pushing direction of the switch button 14.

Though the contacts in the foregoing embodiments are configured so as to establish a conduction state when the click plates are pressed against a plurality of electrodes disposed on the flexible printed circuit board, without being restricted thereto, they may be electric contacts constituted by other generally-known means.

As explained in the foregoing, when one end of the switch button is pushed, the height of the other end raised higher than the outer surface of the camera can be lowered, whereby the appearance of the camera is prevented from deteriorating upon switch button operations.

Embodiment 3

Figure 6:
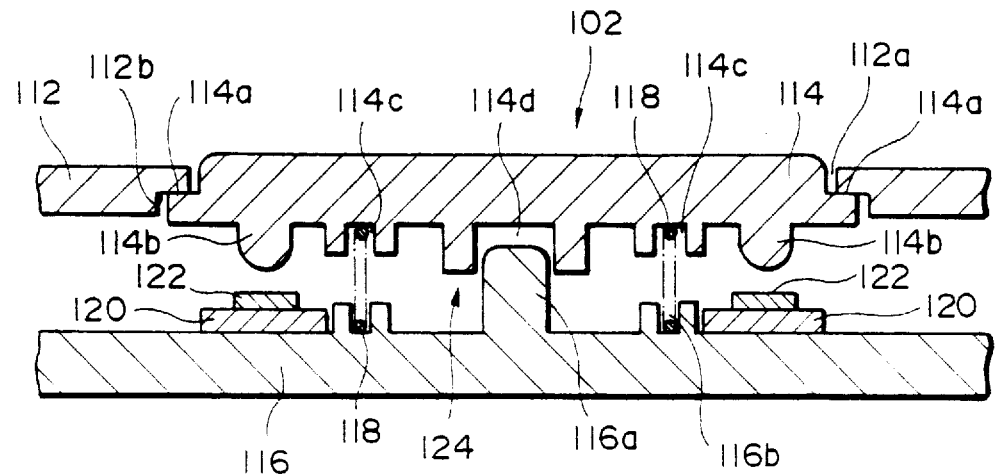
FIG. 6 is a schematic cross-sectional view showing a mode-selecting switch for a camera in accordance with Embodiment 3.

In the following, the configuration of a mode-selecting switch for a camera in accordance with Embodiment 3 will be explained with reference to FIGS. 6 to 8.

In these drawings, a mode-selecting switch 102 has four contacts and is attached to a back cover 112 of the camera 1. The back cover 112 is bored with a switch-button hole 112a, whose inner peripheral portion is provided with an inward flange section 112b.

In the drawings, a disk-shaped switch button 114 has a flange section 114a disposed in the circumferential direction at the edge portion thereof. Disposed near the flange section 114a in its circumferential direction are four contact-pushing sections 114b. Further, disposed inside the contact-pushing sections 114b is a groove-like spring-member securing section 114c to which one end of a spring member 118 is secured.

To an inner frame 116 for securing electric board parts and the like, contacts 120 are attached at positions opposing the respective contact-pushing sections 114b. Each contact 120 establishes a conduction state when a contact member 122 is pressed against an electrode. Disposed inside the contacts 120 in the circumferential direction is a groove-like spring-member securing section 116b, to which the other end of the spring member 118 is attached.

Also, the mode-selecting switch 102 is provided with a stopper section 124 for preventing a plurality of contacts from being concurrently pushed. The stopper section 124 is constituted by a circular recessed section 114d formed on the lower surface of the switch button 114 and a cylindrical protruded section 116a disposed in the inner frame 116 at the position opposing the recessed section 114d.

In order to assemble the mode-selecting switch 102, in the state where the switch button 114 is disposed in the switch-button hole 112a of the back cover 112, one end of the spring member 118 is secured to the spring-member securing section 114c of the switch button 114, and the other end of the spring member 118 is secured to the spring-member securing section 116b of the inner frame 116, the back cover 112 is secured to the inner frame 116 by screwing or the like.

Here, since the switch button 114 is urged toward the back cover 112 by the spring member 118, the flange section 114a of the switch button 114 is maintained in a state where it is pressed against the inward flange section 112b disposed at the inner peripheral portion of the switch-button hole 112a. In this state, the distance between the bottom portion of the recessed section 114d of the switch button 114 and the tip portion of the protruded section 116a of the inner frame 116 is smaller than the distance between the tip portion of the contact-pushing section 114b and the upper face of the contact member 122.

Figure 7:
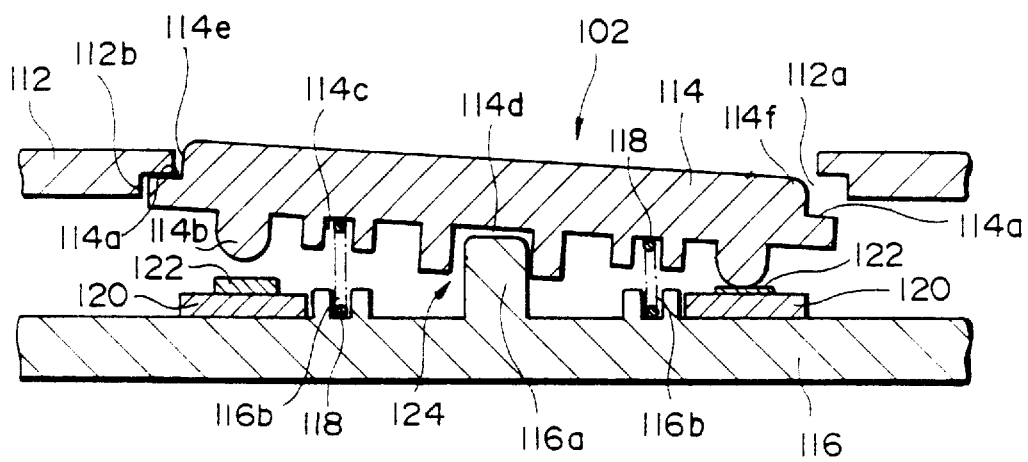
FIG. 7 is a schematic cross-sectional view showing an operating state of the mode-selecting switch for a camera in accordance with Embodiment 3.

When one end 114f of the mode-selecting switch 102 for a camera in accordance with this embodiment is pushed by a finger or the like, as shown in FIG. 7, the switch button 114 pivots about a contact point between the flange section 114a on the opposite side across the center of the switch button 114 with respect to the pushed position and the inward flange section 112b. Consequently, the contact-pushing section 114b at the pushed position pushes the contact member 122, thereby bringing the contact 120 into a conduction state.

Here, when the switch button 114 is pushed at a position near its center, the switch button 114 descends as a whole till the tip portion of the protruded section 116a of the inner frame 116 comes into contact with the bottom portion of the recessed section 114d of the switch button 114. Thereafter, the switch button 114 pivots about the contact point between the tip portion of the protruded section 116a and the bottom portion of the recessed section 114d.

In this case, since an end 114e of the switch button 114 on the side opposite to the pressed position of the switch button 114 is not raised from the surface of the back cover 112, the appearance of the camera is prevented from deteriorating at the time when the mode-selecting switch 102 is operated. Also, as the thickness of the mode-selecting switch can be made smaller than that of the conventional one, it can contribute to size reduction of the camera.

Figure 8:
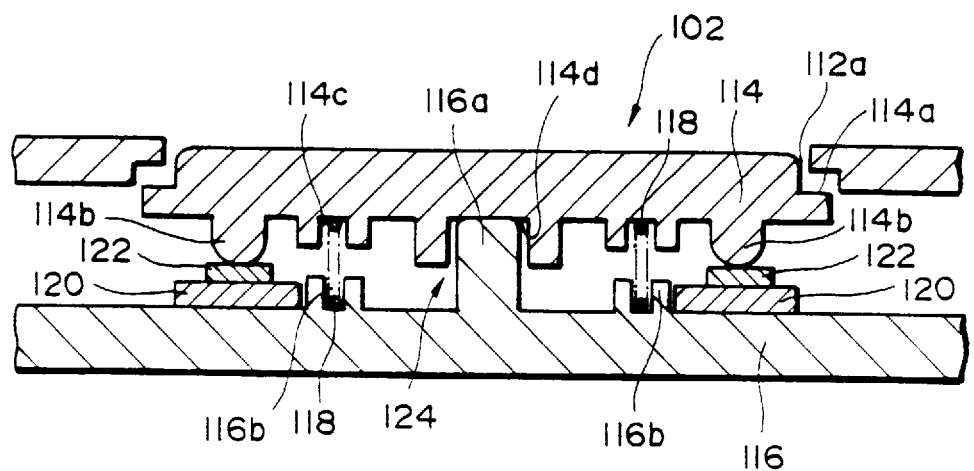
FIG. 8 is a schematic cross-sectional view showing a stopper section of the mode-selecting switch for a camera in accordance with Embodiment 3.

Further, when the switch button 114 is pushed near the center thereof, as shown in FIG. 8, before the tip portion of the contact-pushing section 114b comes into contact with the contact member 122, the bottom portion of the recessed section 114d of the switch button 114 and the tip portion of the protruded section 116a of the inner frame 116 come into contact with each other, whereby the contacts 120 disposed on opposite sides across the stopper section 124 can be prevented from being concurrently pushed.

When the finger or the like pushing the switch button 114 is released, the spring member 118 pushes up the switch button 114 to its initial position.

Embodiment 4

Figure 9:
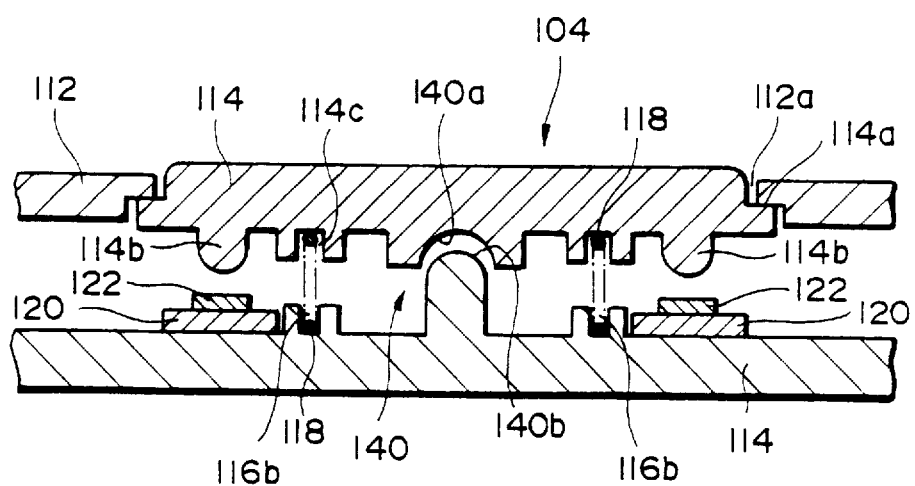
FIG. 9 is a schematic cross-sectional view showing a mode-selecting switch for a camera in accordance with Embodiment 4.

In the following, the configuration of a mode-selecting switch 104 for a camera in accordance with Embodiment 4 will be explained with reference to FIGS. 9 to 11.

In this mode-selecting switch 104, a stopper section 140 is used in place of the stopper section 124 in the mode-selecting switch 102 in accordance with Embodiment 3.

This stopper section 140 is constituted by a recessed section 140a having a spherical inner face disposed on the lower face of the switch button 114 and a protruded section 140b whose tip portion has a spherical outer face disposed in the inner frame 116 at the position opposing the recessed section 140a. Here, it is necessary for the spherical face of the recessed section 140a to have a radius greater than that of the spherical face of the protruded section 140b. In the other part of the configuration, the mode-selecting switch 104 is the same as the mode-selecting switch 102 in accordance with Embodiment 3.

Figure 10:
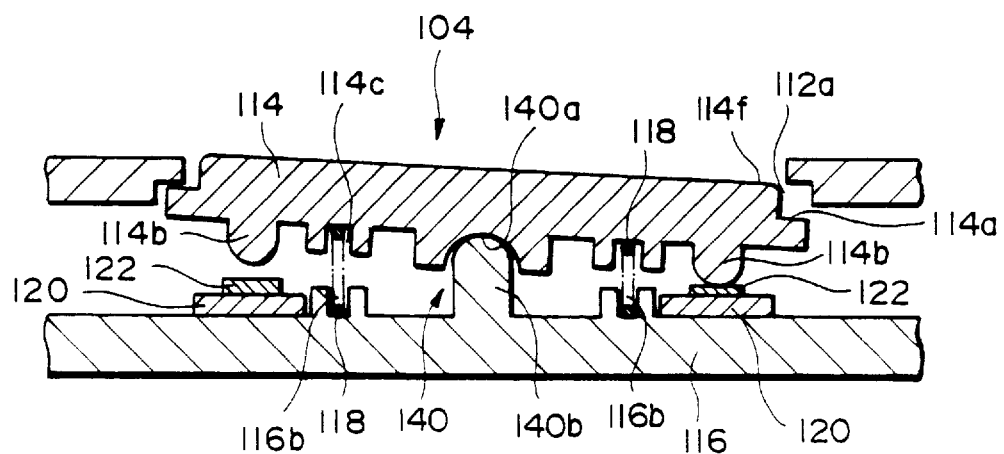
FIG. 10 is a schematic cross-sectional view showing an operating state of the mode-selecting switch for a camera in accordance with Embodiment 4.
Figure 11:
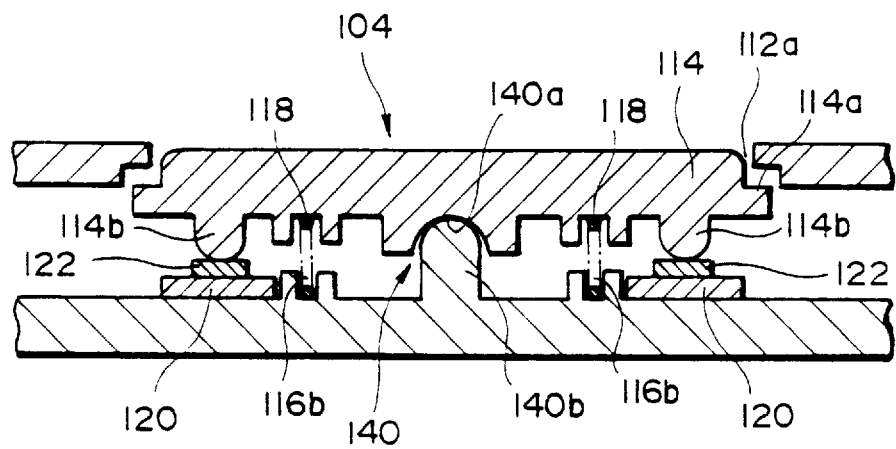
FIG. 11 is a schematic cross-sectional view showing a stopper section of the mode-selecting switch for a camera in accordance with Embodiment 4.

When one end 114f of the mode-selecting switch 104 for a camera in accordance with this embodiment is pushed by a finger or the like, as shown in FIG. 10, the switch button 114 descends as a whole till the tip portion of the protruded section 140b of the inner frame 116 comes into contact with the bottom portion of the recessed section 140a of the switch button 114. Thereafter, the switch button 114 pivots about the contact point between the tip portion of the protruded section 140b and the bottom portion of the recessed section 140a. Consequently, the contact-pushing section 114b at the pushed position pushes the contact member 122, thereby bringing the contact 120 into a conduction state. Here, when an end portion of the switch button 114 is pushed, the switch button 114 pivots about the contact point between the flange section 114a on the opposite side across the center of the switch button 114 with respect to the pushed position and the inward flange section 112b.

In the mode-selecting switch 104 in accordance with this embodiment, since the recessed section 140a having a spherical inner face pivots while in contact with the protruded section 140b having a spherical outer face, the switch button 114 can pivot smoothly. Also, as with the mode-selecting switch for a camera in accordance with Embodiment 3, the switch button 114 on the unpressed side is prevented from rising higher than the surface of the back cover 112, whereby the appearance of the camera does not deteriorate at the time when the mode-selecting switch 104 is operated. Further, as shown in FIG. 11, the contacts 120 can be prevented from being concurrently pushed.

Also, as the thickness of the mode-selecting switch can be made smaller than that of the conventional one, it can contribute to size reduction of the camera.

Embodiment 5

Figure 12:
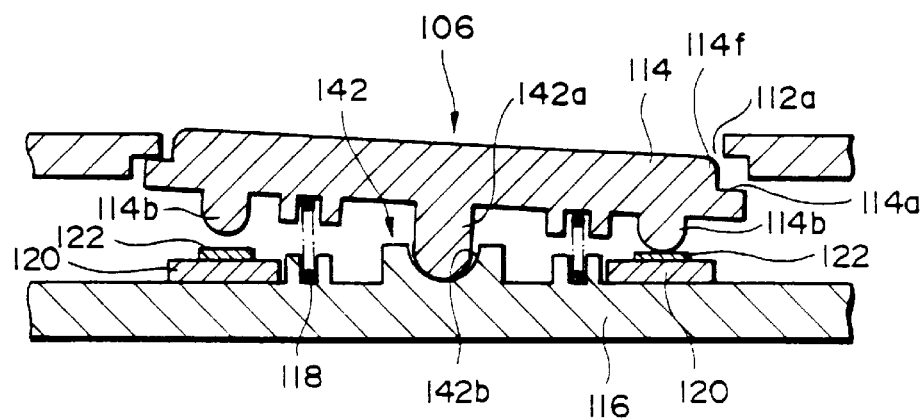
FIG. 12 is a schematic cross-sectional view showing a mode-selecting switch for a camera in accordance with Embodiment 5.

In the following, the configuration of a mode-selecting switch 106 for a camera in accordance with Embodiment 5 will be explained with reference to FIG. 12.

In this mode-selecting switch 106, a stopper section 142 is used in place of the stopper section 140 in the mode-selecting switch 104 in accordance with Embodiment 4.

This stopper section 142 is constituted by a protruded section 142a whose tip portion has a spherical outer face disposed on the lower face of the switch button 114 and a recessed section 142b having a spherical inner face disposed in the inner frame 116 at the position opposing the protruded section 142a. Here, it is necessary for the spherical face of the recessed section 142b to have a radius greater than that of the spherical face of the protruded section 142a. In the other part of the configuration, the mode-selecting switch 106 is the same as the mode-selecting switch 104 in accordance with Embodiment 4.

When one end 114f of the mode-selecting switch 106 for a camera in accordance with this embodiment is pushed by a finger or the like, the switch button 114 descends as a whole till the tip portion of the protruded section 142a of the switch button 114 comes into contact with the bottom portion of the recessed section 142b of the switch button 114. Thereafter, the switch button 114 pivots about the contact point between the tip portion of the protruded section 142a and the bottom portion of the recessed section 142b. Consequently, the contact-pushing section 114b at the pushed position pushes the contact member 122, thereby bringing the contact 120 into a conduction state. Here, when an end portion of the switch button 114 is pushed, the switch button 114 pivots about the contact point between the flange section 114a on the opposite side across the center of the switch button 114 with respect to the pushed position and the inward flange section 112b.

In the mode-selecting switch 106 in accordance with this embodiment, since the recessed section 142b having a spherical inner face pivots while in contact with the protruded section 142a having a spherical outer face, as with the mode-selecting switch 104 in accordance with Embodiment 4, the switch button 114 can pivot smoothly, and the appearance of the camera does not deteriorate at the time when the mode-selecting switch 106 is operated. Further, as the thickness of the mode-selecting switch can be made smaller than that of the conventional one, it can contribute to size reduction of the camera.

Though Embodiments 3 to 5 exemplify the cases where the number of contacts is four, without being restricted thereto, the present invention is also applicable to the case where the number of contacts is two, three, or more than four.

Figure 13:
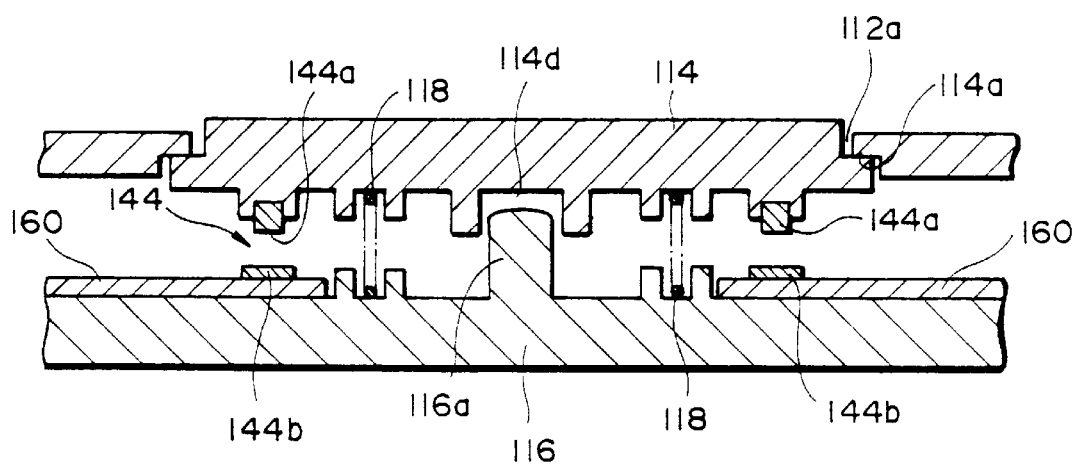
FIG. 13 is a schematic cross-sectional view showing a modified example of a contact in the mode-selecting switch for a camera in accordance with an embodiment of the present invention.
Figure 14:
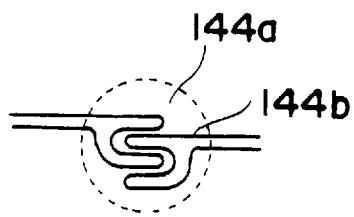
FIG. 14 is a schematic plan view showing the contact of the mode-selecting switch shown in FIG. 13.

As shown in FIGS. 13 and 14, each contact in the foregoing embodiments may be constituted by a conductive rubber 144a attached to the switch button 114 and an electrode pattern 144b disposed on a printed circuit board 160.

Figure 15:
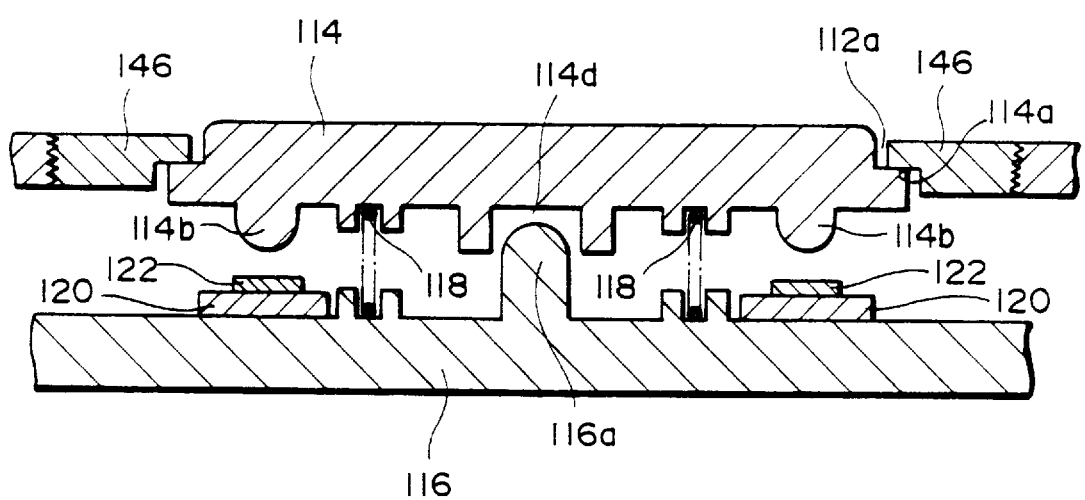
FIG. 15 is a schematic cross-sectional view showing an example wherein a flange section to which the switch button of the mode-selecting switch in accordance with an embodiment of the present invention abuts is provided separately from a back cover.
Figure 16:
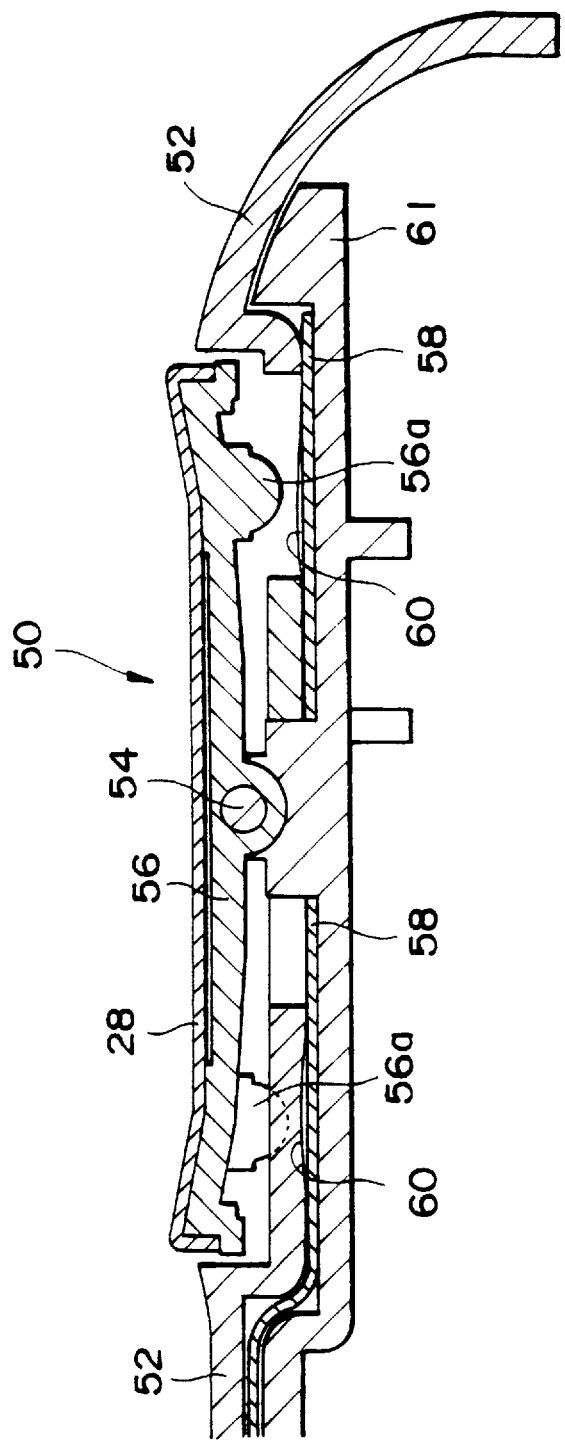
FIG. 16 is a schematic cross-sectional view showing a conventional mode-selecting switch for a camera.
Figure 17:
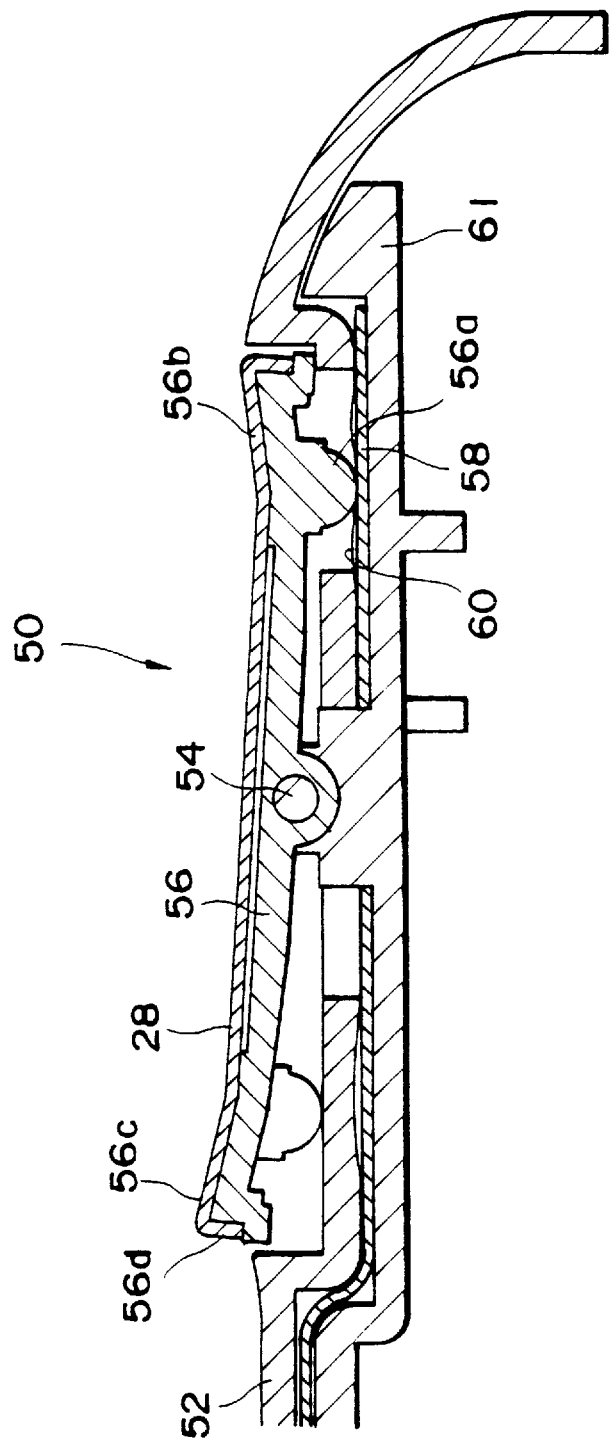
FIG. 17 is a schematic cross-sectional view showing an operating state of the conventional mode-selecting switch for a camera.

Though the switch button 114 is held by the inward flange section 112b integrally formed with the back cover 112, without being restricted thereto, as shown in FIG. 15, a switch-button holding member 146 may be provided separately from the back cover 112 so as to hold the switch button 114. The switch-button holding member 146 has a ring-like form having a thread and an inward flange section respectively at its outer and inner peripheries. When the switch-button holding member 146 is used, after the main body of the camera is assembled, the spring member and the switch button are dropped therein, and the switch-button holding member 146 is screwed into a threaded groove formed in the inner peripheral face of the switch-button hole 112a of the back cover 112, thereby accomplishing the assembly. Accordingly, the assembling operation becomes quite simple.

Further, the contact may be formed by an electrode mounted on a printed circuit board and a click plate disposed thereon, and the repulsion force of the click plate may be increased so as to urge the switch button in the direction opposite to the pushing direction.

In accordance with the present invention, when one end of the switch button is pushed, the other end is prevented from rising up, whereby the appearance of the camera does not deteriorate at the time when the switch button is operated. Also, as the thickness of the mode-selecting switch can be made smaller than that of the conventional one, it can contribute to size reduction of the camera.

Further, when the stopper section is provided, the contact-pushing sections on opposite sides across the stopper section can be prevented from concurrently pushing the contacts, whereby the operability of the switch can be improved.

Also, when the stopper section is constituted by a recessed section having a spherical inner face formed in the switch button or inner frame and a protruded section having a spherical outer face formed in the inner frame or switch button, the switch button can pivot smoothly.

Various members such as the switch button, exterior parts of the camera, and inner frame may be made of plastics, insulated metals, composite materials formed by plastics and metals, or the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No.8-244998 (244998/1996) filed on Sep. 17, 1996 and No.8-244999 (244999/1996) filed on Sep. 17, 1996 are hereby incorporated by reference.

What is claimed is:

1. A switch for a camera comprising:
   a switch button having a plurality of contact-pushing sections and a through-hole disposed between the contact-pushing sections;
   a plurality of contacts disposed at positions opposing the contact-pushing sections of said switch button;
   a switch-button holding member for holding said switch button, said switch-button holding member having one end provided with a flange section and the other end provided with an axis section, said axis section penetrating through the through-hole of said switch button; and
   urging means for urging said switch button toward the flange section of said switch-button holding member, wherein said switch button is held so as to be movable in a direction along which said switch button is pushed and a direction perpendicular to said pushing direction.

2. A switch for a camera according to claim 1, wherein said contacts establish a conduction state when a click plate is pressed against a plurality of electrodes disposed on a printed circuit board.

3. A switch for a camera according to claim 1, wherein said switch button has a disk-shaped form, said contact-pushing sections being disposed on a lower face of said switch button in a circumferential direction thereof with substantially identical intervals.

4. A switch for a camera according to claim 3, further comprising a stopper section for preventing said plurality of contacts from being concurrently pushed.

5. A switch for a camera comprising:
   a switch button having a plurality of contact-pushing sections and an edge portion;
   a plurality of contacts disposed at positions opposing the contact-pushing sections of said switch button;
   an exterior part of the camera; and
   urging means for urging
   said edge portion into abutment with an interior surface of said exterior part,
   said switch button being pivotable as a body about said edge portion with said edge portion abutting said interior surface of said exterior part to bring any one of said contact-pushing sections into and out of engagement with a corresponding one of said contacts.

6. A switch for a camera according to claim 5, wherein said switch button is pivotable as a rigid body about said edge portion.

7. A switch for a camera according to claim 5, wherein said urging means urges said edge portion against said interior surface around an entire periphery of said switch button.

8. A switch for a camera according to claim 7, wherein said switch button is disc-shaped.

9. A switch for a camera according to claim 5, wherein said switch button is pivotable about said edge portion in a plurality of directions.

10. A switch for a camera comprising:
    a switch button having a plurality of contact-pushing sections;
    a plurality of contacts disposed at positions opposing the contact-pushing sections of said switch button;
    an exterior part of the camera;
    urging means for urging said switch button toward said exterior part; and
    a stopper section for preventing said plurality of contacts from being concurrently pushed,
    wherein said switch button is held in a state in which an edge portion thereof abuts to said exterior part.

11. A switch for a camera according to claim 10, further comprising an inner frame disposed inside said exterior part so as to be adjacent thereto;
    wherein said stopper section comprises a recessed section and a protruded section, said recessed section having a spherical inner face and being disposed substantially at a center portion of a lower face of said switch button, said protruded portion having a spherical outer face and being disposed in said inner frame at a position opposing said recessed section.

12. A switch for a camera according to claim 10, further comprising an inner frame disposed inside said exterior part so as to be adjacent thereto;

wherein said stopper section comprises a protruded section and a recessed section, said protruded section having a spherical outer face and being disposed substantially at a center portion of a lower face of said switch button, said recessed portion having a spherical inner face and being disposed in said inner frame at a position opposing said protruded section.

* * * * *